United States Patent
Ye et al.

(10) Patent No.: US 10,147,153 B2
(45) Date of Patent: Dec. 4, 2018

(54) SUPERVISION AND PENALTY METHOD AND SYSTEM FOR EXPRESSWAY EMERGENCY LANE OCCUPANCY

(71) Applicant: SOUTHEAST UNIVERSITY, Nanjing (CN)

(72) Inventors: Zhirui Ye, Nanjing (CN); Yu Yan, Nanjing (CN); Jiaojiao Zhu, Nanjing (CN); Yingzi Huang, Nanjing (CN); Cuicui Sun, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 15/570,340

(22) PCT Filed: Mar. 3, 2017

(86) PCT No.: PCT/CN2017/075602
§ 371 (c)(1),
(2) Date: Oct. 29, 2017

(87) PCT Pub. No.: WO2018/045731
PCT Pub. Date: Mar. 15, 2018

(65) Prior Publication Data
US 2018/0293684 A1    Oct. 11, 2018

(30) Foreign Application Priority Data
Sep. 7, 2016   (CN) .......................... 2016 1 0809099

(51) Int. Cl.
*G06K 9/00*   (2006.01)
*G06Q 50/26*   (2012.01)
(Continued)

(52) U.S. Cl.
CPC ....... *G06Q 50/265* (2013.01); *G06K 9/00798* (2013.01); *G06K 9/3258* (2013.01);
(Continued)

(58) Field of Classification Search
CPC ............... G06Q 50/265; G08G 1/0175; G06K 9/00798; G06K 9/344; G06K 9/3258;
(Continued)

(56) References Cited

U.S. PATENT DOCUMENTS

2003/0214585 A1* 11/2003 Bakewell ............... G08G 1/054
348/148
2009/0309974 A1* 12/2009 Agrawal .................. G08G 1/04
348/159
(Continued)

FOREIGN PATENT DOCUMENTS

CN        103956046 A     7/2014
CN        104680794 A     6/2015
(Continued)

*Primary Examiner* — Samir Ahmed
(74) *Attorney, Agent, or Firm* — Gokalp Bayramoglu

(57) ABSTRACT

A supervision and penalty method and system for expressway emergency lane occupancy based on public supervision and reporting. The system includes a mobile terminal and a central computer. When a citizen notices a violation behavior of emergency lane occupancy of another vehicle, evidence is collected by photographing and images are uploaded to the central computer; meanwhile, user location information is automatically read and uploaded. The central computer acquires, through network transmission, image information and location information uploaded by a client, distinguishes whether it is a malicious reporting behavior and performs technical processing and license plate recognition on the uploaded images, checks the road section where the violation behavior occurs, and determines whether the violation behavior is an emergency lane violation behavior. The computer automatically searches for and matches owner information corresponding to the license plate number of the violation vehicle, and automatically sends a penalty decision from the background.

7 Claims, 2 Drawing Sheets

(51) Int. Cl.
*G06K 9/32* (2006.01)
*G06K 9/34* (2006.01)
*G08G 1/017* (2006.01)
*G06T 5/00* (2006.01)

(52) U.S. Cl.
CPC ........... *G06K 9/344* (2013.01); *G08G 1/0175* (2013.01); *G06K 9/00825* (2013.01); *G06K 2209/01* (2013.01); *G06K 2209/15* (2013.01); *G06T 5/002* (2013.01)

(58) Field of Classification Search
CPC ........... G06K 2209/01; G06K 2209/15; G06K 9/00825; G06T 5/002
See application file for complete search history.

(56) References Cited

U.S. PATENT DOCUMENTS

| | | | | |
|---|---|---|---|---|
| 2010/0169007 | A1* | 7/2010 | Kaushik | G01C 21/26 701/532 |
| 2014/0071286 | A1* | 3/2014 | Bernal | G06T 7/20 348/149 |
| 2014/0226011 | A1* | 8/2014 | Park | G06T 7/60 348/148 |
| 2015/0149086 | A1* | 5/2015 | Alberth, Jr. | G01C 21/10 701/519 |
| 2016/0070986 | A1* | 3/2016 | Chidlovskii | G06K 9/00785 382/104 |
| 2016/0155020 | A1* | 6/2016 | Tariq | G06K 9/00771 382/105 |

FOREIGN PATENT DOCUMENTS

| | | |
|---|---|---|
| CN | 104778831 A | 7/2015 |
| CN | 105243842 A | 1/2016 |
| CN | 105608906 A | 5/2016 |
| CN | 106205144 A | 12/2016 |
| KR | 20050005256 A | 1/2005 |
| KR | 20060020828 A | 3/2006 |

* cited by examiner

SUPERVISION AND PENALTY METHOD AND SYSTEM FOR EXPRESSWAY EMERGENCY LANE OCCUPANCY

CROSS REFERENCE TO RELATED APPLICATIONS

This application is the national phase entry of International Application PCT/CN2017/075602, filed on Mar. 03, 2017, which is based upon and claims priority to Chinese Patent Application No. CN201610809099.9, filed on Sep. 07, 2016, the entire contents of which are incorporated herein by reference.

TECHNICAL FIELD

The present invention relates to the technical field of traffic supervision, and more particularly to a public supervision and penalty method and system for expressway emergency lane occupancy.

BACKGROUND

Expressway emergency lanes are special passages for vehicles on emergency services such as engineering rescue, fire rescue, medical rescue, or urgent business of civilian police. Article 82 of Regulation on the Implementation of the Road Traffic Safety Law of the People's Republic of China specifies that, motor vehicles shall not travel or stop on an emergency lane in a non-emergency situation when traveling on an expressway. An emergency situation generally refers to vehicle breakdown and waiting for rescue, traffic accidents and waiting for rescue, sudden onset of diseases and waiting for rescue, or the like. The expressway emergency lane can be regarded as a lifeline that must not be blocked. However, many ill-mannered drivers ignore the regulation. Especially when expressway congestion is caused by unexpected accidents or large traffic flows during festivals and holidays, they illegally occupy the emergency lanes for traveling and overtaking in order to move fast, eventually causing blocking of the emergency lanes. As a result, various types of emergency vehicles cannot rapidly reach the accident spots, and irreversible damages will be caused to personal safety and property security of others. The current regulation specifies that, the violation of emergency lane occupancy shall lead to a deduction of 6 points and a fine of 200 RMB. However, as evidence of a violation behavior of emergency lane occupancy can only be collected by electronic police and expressway traffic police on the spot at present, some drivers have the fluke mind that they will not get caught, and thus the violation behavior repeatedly occurs in spite of the regulation.

Very few mobile terminal-based methods or systems for collecting evidence of traffic violation behaviors are available currently, and special mobile phone apps of reporting traffic violation behaviors using "snapshot" have already emerged. Taking the software "Violation Snapshot" for example, after taking violation photos, users can select among options of "traffic violation", "black smoke emission", "spilling on road", and "save and send later" according to the violation situation, and then inform related government departments by one click before transferring to personal microblogs. Such reporting behavior can enhance public awareness of supervision of law enforcement, and improve law enforcement efficiency of the traffic control department. The captured violation photos can be used by the traffic control department as vehicle violation clues or evidence after the photos are checked by the traffic control department.

However, the significant defects of the App lie in that: 1. the privacy of the reporter cannot be effectively protected and malicious retaliation may occur; 2. if a reward mechanism is introduced, occupational "snapshooters" may emerge; and 3. after the report information is transferred to official microblog of the traffic control department, timely manual processing is required, and sufficient manpower is needed, and in the actual situation, the report information often fails to be processed in time and even no feedback is provided.

SUMMARY OF THE INVENTION

To reduce violation behaviors of expressway emergency lane occupancy, the present invention is provided to compensate for, through public supervision, the defect that currently the violation behaviors of expressway emergency lane occupancy can only be penalized by electronic police and expressway traffic police on the spot, such that nearly every violation behavior can be effectively targeted and penalized, and drivers are forced to give up the fluke mind that they will not get caught. Also, a supervision and penalty system for expressway emergency lane occupancy in which a citizen real-name reporting client interworks with a central computer is used to intelligently recognize and penalize the violation behaviors of emergency lane occupancy, achieving timely processing and manpower saving.

To achieve the above objectives, the present invention adopts the following technical solutions.

A supervision and penalty system for expressway emergency lane occupancy includes a mobile-terminal citizen real-name reporting client and a central computer.

The mobile-terminal citizen real-name reporting client includes a real-name authentication module, an image uploading module, a positioning, storing and uploading module, an information access module, and an account association module. The real-name authentication module is used to receive personal identity information of a registered user; the image uploading module is used to receive violation photos taken by the user and upload the photos to the background central computer; and the positioning, storing and uploading module is used to read current location information of the user when taking the photos, and automatically store and match the violation photos taken by the user.

The central computer includes an image identification unit, an image processing unit, an image recognition unit, a violation determining unit, an information matching unit, and a data storage unit. The image identification unit parses coded information of the images and determines whether the images are originally captured and are not edited at a later stage, where the supported image formats include common formats such as BMP, JPEG, GIF, AI, and PNG. The image processing unit provides a basis for image feature extraction, and is mainly used to pre-processing the captured images, including image code compression, image enhancement and restoration, image segmentation and image description. The purpose of image enhancement and restoration is to improve the image quality, eliminate noises, and improve the image definition, so as to facilitate subsequent feature recognition. The image recognition unit recognizes and records the license plate number of a violation vehicle through a license plate positioning module, a license plate character segmentation module, and a license plate character recognition module. The license plate positioning module is used to perform image feature search to find several areas conforming to license plate features as candidate areas, analyze the candidate areas to select a most matching area as an area to be recognized, and separate the area from the images. The license plate character segmentation module is used to segment the selected license plate area into individual characters to be recognized respectively, where a vertical projection method is adopted for the character segmentation. The license plate character recognition module performs feature extraction on the segmented characters mainly based on artificial neural networks, and trains a neural network distributor using the obtained features, so as to obtain results by matching. The image recognition unit recognizes an emergency lane boundary using pixel-level features by extracting road edges and characteristic curves. The violation determining unit includes a lane boundary determining module and a vehicle state determining module. The lane boundary determining module determines whether a vehicle is on an emergency lane according to an emergency lane boundary recognized by the image recognition unit. The vehicle state determining module automatically compares two or more processed photos to determine whether a vehicle is traveling, pulling over or stopping on an emergency lane. That is, the module automatically selects feature points of the images and compares relative positions between the feature points to determine the state of a vehicle, and if the vehicle is in a stopping state, the module continues to automatically search for red feature points in the images, and determines whether double flashing lights of the vehicle are turned on to indicate an emergent breakdown situation, and if it is impossible to make a determination, the module records the serial numbers of the images and feeds back the same to a manual processing side. The information matching unit is used to access a provincial registered vehicle owner information database, and upon obtaining the license plate number of a violation vehicle, search for corresponding owner information including name, contact address and the like according to the license plate number. The data storage unit maximizes data extraction convenience and storage security in a mixture of online storage and nearline storage.

The citizen real-name reporting client may store and send, through image transmission by a reporter and positioning, information of a vehicle traveling on and occupying an emergency lane; the central computer may receive image and location information from the client through network transmission under a network data transmission encryption protocol, examines through a computer built-in examining module whether the images are properly captured, checks the road section where the violation behavior occurs, and determines whether the violation behavior is an emergency lane violation behavior, recognizes and records the license plate, accesses owner information for fine and point deduction notification, and rewards the reporter.

In a further embodiment, provided is a supervision and penalty method for expressway emergency lane occupancy, including, for one reporting behavior, the following steps.

Step 1: When a vehicle is traveling on or occupying an emergency lane and another vehicle passing by notices the violation behavior, the mobile-terminal citizen real-name reporting client is turned on and the client is allowed to read the user location and photograph the driving state of the vehicle, where the photos are required to clearly show the license plate number and the emergency lane line, and at least two photos are taken. After the photos are taken, the reporter selects and uploads the images and adds simple description to the images, for example, I noticed violation behavior of emergency lane occupancy on  road section of  expressway; and the central computer obtains the report images, location, and image transmission time in real time through network transmission.

Step 2: After obtaining the violation images and location information, the central computer preliminarily distinguishes the image source through the image identification unit to determine whether the images are taken in normal conditions, and if yes, performs Step 3; otherwise, sends a warning to the reporter, provides feedback to the client through an information feedback mechanism, and imposes a penalty (deducting client-side bonus points, imposing a fine, adding to the blacklist, or the like).

Step 3: The central computer performs compression, enhancement and restoration, segmentation and description processing on the uploaded violation images through the image processing unit, so as to eliminate noises, improve the image definition, and enable the captured images to be more easily recognized and distinguished.

Step 4: The central computer performs accurate recognition on the license plate in the images by applying the license plate positioning module, the license plate character segmentation module, and the license plate character recognition module in the image recognition unit, and recognizes an emergency lane boundary using pixel-level features by extracting road edges and characteristic curves.

Step 5: The central computer performs violation determination on the reported vehicle through the violation determining unit, and if it is determined that the vehicle occupies the emergency lane in a non-emergency situation, performs Step 6; otherwise, explains the situation to the reporter, and provides feedback to the client through the information feedback mechanism.

Step 6: The central computer invokes the database in the system through the information matching unit to automatically search for registered owner information corresponding to the license plate of the violation vehicle, sends a violation-handling decision (including the license plate number of the vehicle in violation, time of violation, place of violation, and cause of violation), and specifies a time limit within which the owner should deal with the violation at a specific public security department; meanwhile, the central computer checks the reporter information and rewards the reporter after determining that the report is effective.

Step 7: All the reporter information and corresponding reported violation place information, license plate information of the violation vehicle, and owner information of the violation vehicle are stored as an entire information block in the data storage unit for future reference.

Compared with the prior art, the technical solutions of the present invention have the following technical effects. The existing problems in which expressway emergency lanes are lack of supervision, violation behaviors are difficult to target and deal with, police force is inadequate, and it is impossible to realize real-time monitoring of all road sections can be solved by motivating the citizens based on public supervision, so as to raise the civic awareness of drivers and force drivers to give up the fluke mind that they will not get caught. In addition, the system has the function of automatically recognizing and handling violation behaviors of emergency lane occupancy without requiring manual processing. Compared with the existing method of manually processing report information, the system improves the penalty efficiency and further promotes the development of intelligent traffic management.

DETAILED DESCRIPTION OF THE INVENTION

The technical solutions of the present invention are further illustrated below with reference to the accompanying drawings.

Figure 1:
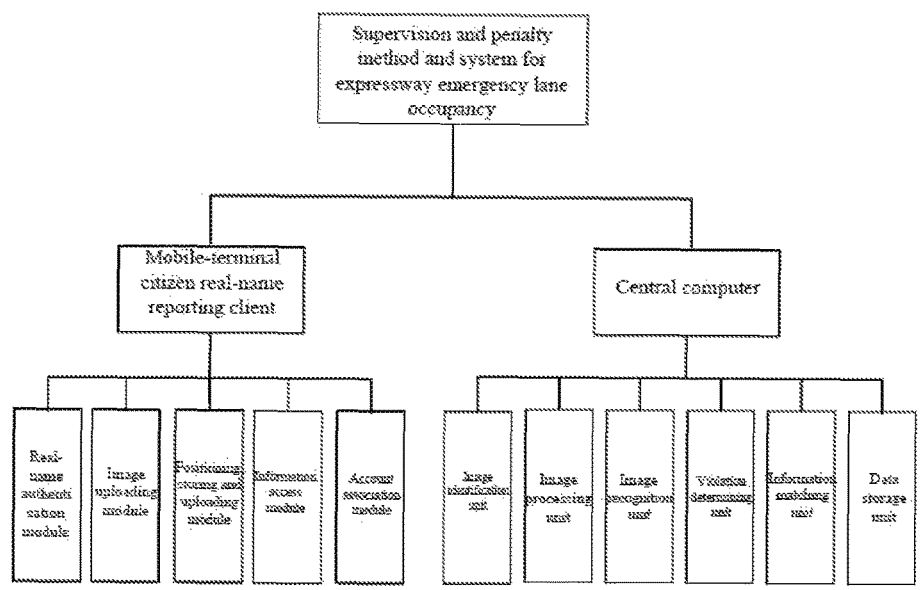
FIG. 1 is a schematic structural diagram illustrating overall functions of the present invention.

As shown in FIG. 1, a supervision and penalty system for expressway emergency lane occupancy includes a mobile-terminal citizen real-name reporting client and a central computer. The mobile-terminal citizen real-name reporting client includes a real-name authentication module, an image uploading module, a positioning, storing and uploading module, an information access module, and an account association module. The real-name authentication module is used to receive personal identity information of a registered user. The image uploading module is used to receive violation photos taken by the user and uploading the photos to the background central computer. The positioning, storing and uploading module is used to read current location information of the user when taking the photos, and automatically store and match the violation photos taken by the user.

The central computer includes an image identification unit, an image processing unit, an image recognition unit, a violation determining unit, an information matching unit, and a data storage unit. The image identification unit parses coded information of the images and determines whether the images are originally captured and are not edited at a later stage, where the supported image formats include common formats such as BMP, JPEG, GIF, AI, and PNG. The image processing unit provides a basis for image feature extraction, and is mainly used to pre-processing the captured images, including image code compression, image enhancement and restoration, image segmentation and image description. The purpose of image enhancement and restoration is to improve the image quality, eliminate noises, and improve the image definition, so as to facilitate subsequent feature recognition. The image recognition unit recognizes and records the license plate number of a violation vehicle through a license plate positioning module, a license plate character segmentation module, and a license plate character recognition module. The license plate positioning module is used to perform image feature search to find several areas conforming to license plate features as candidate areas, analyze the candidate areas to select a most matching area as an area to be recognized, and separate the area from the images. The license plate character segmentation module is used to segment the selected license plate area into individual characters to be recognized respectively, where a vertical projection method is adopted for the character segmentation. The license plate character recognition module performs feature extraction on the segmented characters mainly based on artificial neural networks, and trains a neural network distributor using the obtained features, so as to obtain results by matching. The image recognition unit recognizes an emergency lane boundary using pixel-level features by extracting road edges and characteristic curves. The violation determining unit includes a lane boundary determining module and a vehicle state determining module. The lane boundary determining module determines whether a vehicle is on an emergency lane according to an emergency lane boundary recognized by the image recognition unit. The vehicle state determining module automatically compares two or more processed photos to determine whether a vehicle is traveling, pulling over or stopping on an emergency lane. That is, the module automatically selects feature points of the images and compares relative positions between the feature points to determine the state of a vehicle, and if the vehicle is in a stopping state, the module continues to automatically search for red feature points in the images, and determines whether double flashing lights of the vehicle are turned on to indicate an emergent breakdown situation, and if it is impossible to make a determination, the module records the serial numbers of the images and feeds back the same to a manual processing side. The information matching unit is used to access a provincial registered vehicle owner information database, and upon obtaining the license plate number of a violation vehicle, search for corresponding owner information including name, contact address and the like according to the license plate number. The data storage unit maximizes data extraction convenience and storage security in a mixture of online storage and nearline storage. The citizen real-name reporting client may store and send, through image transmission by a reporter and positioning, information of a vehicle traveling on and occupying an emergency lane; the central computer may receive image and location information from the client through network transmission under a network data transmission encryption protocol, examines through a computer built-in examining module whether the images are properly captured, checks the road section where the violation behavior occurs, and determines whether the violation behavior is an emergency lane violation behavior, recognizes and records the license plate, accesses owner information for fine and point deduction notification, and rewards the reporter.

Figure 2:
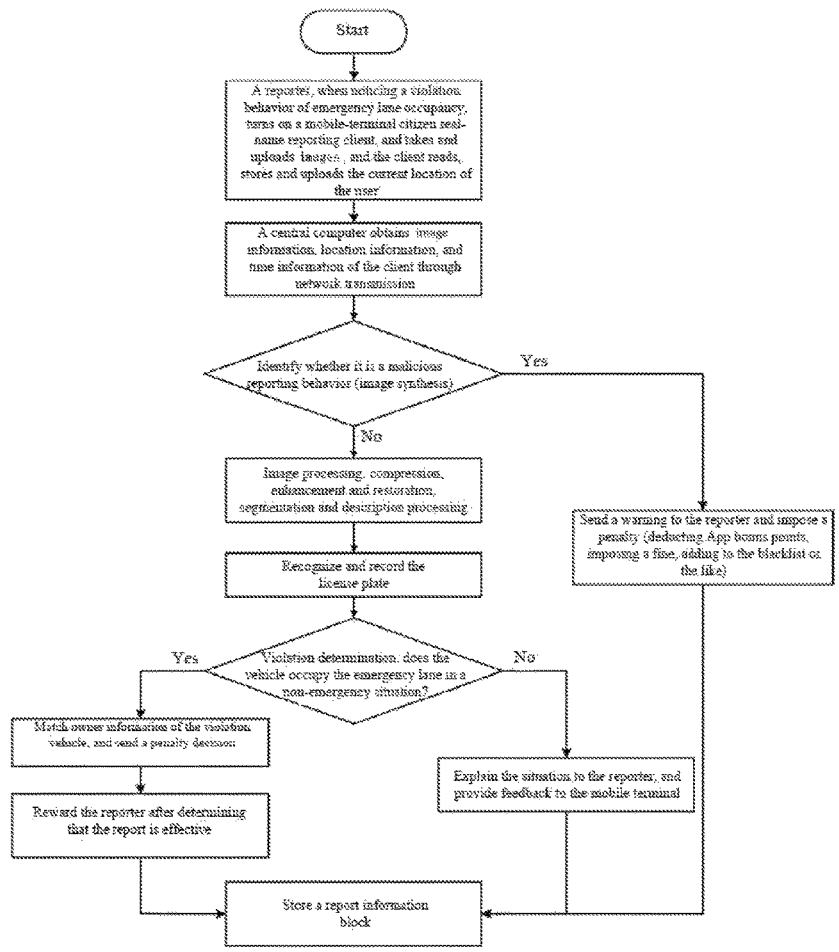
FIG. 2 is a system implementation flowchart of a reporting behavior.

As shown in FIG. 2, a specific implementation of the present invention is as follows:

Step 1: When a vehicle is traveling on or occupying an emergency lane and another vehicle passing by notices the violation behavior, the mobile-terminal citizen real-name reporting client is turned on and the client is allowed to read the user location and photograph the driving state of the vehicle, where the photos are required to clearly show the license plate number and the emergency lane line, and at least two photos are taken. After the photos are taken, the reporter selects and uploads the images and adds simple description to the images, for example, I noticed violation behavior of emergency lane occupancy on  road section of  expressway; and the central computer obtains the report images, location, and image transmission time in real time through network transmission.

Step 2: After obtaining the violation images and location information, the central computer preliminarily distinguishes the image source through the image identification unit to determine whether the images are taken in normal conditions, and if yes, performs Step 3; otherwise, sends a warning to the reporter, provides feedback to the client through an information feedback mechanism, and imposes a penalty (deducting client-side bonus points, imposing a fine, adding to the blacklist, or the like).

Step 3: The central computer performs compression, enhancement and restoration, segmentation and description processing on the uploaded violation images through the image processing unit, so as to eliminate noises, improve the image definition, and enable the captured images to be more easily recognized and distinguished.

Step 4: The central computer performs accurate recognition on the license plate in the images by applying the license plate positioning module, the license plate character segmentation module, and the license plate character recognition module in the image recognition unit, and recognizes an emergency lane boundary using pixel-level features by extracting road edges and characteristic curves.

Step 5: The central computer performs violation determination on the reported vehicle through the violation determining unit, and if it is determined that the vehicle occupies the emergency lane in a non-emergency situation, performs Step 6; otherwise, explains the situation to the reporter, and provides feedback to the client through the information feedback mechanism.

Step 6: The central computer invokes the database in the system through the information matching unit to automatically search for registered owner information corresponding to the license plate of the violation vehicle, sends a violation-handling decision (including the license plate number of the vehicle in violation, time of violation, place of violation, and cause of violation), and specifies a time limit within which the owner should deal with the violation at a specific public security department; meanwhile, the central computer checks the reporter information and rewards the reporter after determining that the report is effective.

Step 7: All the reporter information and corresponding reported violation place information, license plate information of the violation vehicle, and owner information of the violation vehicle are stored as an entire information block in the data storage unit for future reference.

The implementation of the present invention is illustrated in detail above with reference to the accompanying drawings, but the present invention is not limited thereto. It is apparent to persons of ordinary skill in the art that various changes can be made without departing from the spirit of the present invention. The aforementioned functional modules are merely preferred embodiments of the present invention, and are not intended to limit the present invention in any way. Without departing from the scope of the technical solutions of the present invention, any person skilled in the art can make variations or modifications to form equivalent embodiments according to the technical content disclosed above. Any simple variations, equivalent substitutions and modifications made to the foregoing embodiments within the spirit and principle of the present invention according to the technical essence of the present invention without departing from the content of the technical solutions of the present invention shall fall within the scope of the technical solutions of the present invention.

What is claimed is:

1. A supervision and penalty system for expressway emergency lane occupancy, comprising a mobile terminal and a central computer, wherein the mobile terminal further comprises a real-name authentication module, an image uploading module, and a positioning, storing and uploading module, wherein the real-name authentication module is used to receive personal identity information of a registered user; the image uploading module is used to receive a plurality of violation photos taken by the user and upload the plurality of violation photos to a background central computer; and the positioning, storing and uploading module is used to read current location information of the user when taking a photo, and automatically store and match the plurality of violation photos taken by the user;

the central computer further comprises an image identification unit, an image processing unit, an image recognition unit, a violation determining unit, an information matching unit, and a data storage unit; wherein the image identification unit is used to parse coded information of a plurality of images and determine whether each of the plurality of images is an original image without a later-stage editing; the image processing unit is used to pre-process a plurality of captured images, so as to improve the image quality, eliminate noises, and improve the image definition; the image recognition unit recognizes and records a license plate number of a violation vehicle through a license plate positioning module, a license plate character segmentation module, and a license plate character recognition module; the violation determining unit further comprises a lane boundary determining module and a vehicle state determining module; wherein the lane boundary determining module determines whether a vehicle is on an emergency lane according to an emergency lane boundary recognized by the image recognition unit; the vehicle state determining module automatically compares two or more processed photos to determine whether the vehicle is traveling, pulling over or stopping on the emergency lane; the vehicle state determining module automatically selects a feature point of each of the plurality of images and compares a relative position between the feature points to determine a state of the vehicle, and if the vehicle is in a stopping state, the vehicle state determining module continues to automatically search for a red feature point in the each of the plurality of images, and determines whether a double flashing light of the vehicle is turned on to indicate an emergency breakdown situation, and if it is impossible to make a determination, the vehicle state determining module records a serial number of the each of the plurality of images and feeds back the same to a manual processing side;

the information matching unit is used to access a provincial registered vehicle owner information database, and upon obtaining the license plate number of the violation vehicle, search for corresponding owner information according to the license plate number;

the data storage unit is used to maximize a data extraction convenience and storage security in a mixture of an online storage and a nearline storage;

the mobile terminal stores and sends, through an image transmission by a reporter and a positioning of the reporter, information of a vehicle traveling on and occupying the emergency lane; the central computer receives the plurality of images and location information from the mobile terminal through a network transmission under a network data transmission encryption protocol, examines, through a computer built-in examining module, whether the plurality of images are properly captured, checks a road section where a violation behavior occurs, and determines whether the violation behavior is an emergency lane violation behavior, recognizes and records the license plate, accesses owner information for a fine and point deduction notification, and rewards the reporter.

2. The supervision and penalty system for expressway emergency lane occupancy according to claim 1, wherein in the image recognition unit, the license plate positioning module is used to perform an image feature search to find a plurality of areas conforming to a plurality of license plate features as a plurality of candidate areas, analyze the plurality of candidate areas to select a most matching area as an area to be recognized, and separate the area to be recognized from the image; the license plate character segmentation module is used to segment a selected license plate area into a plurality of individual characters to be recognized respectively, wherein a vertical projection method is adopted for a character segmentation; the license plate character recognition module performs a feature extraction on a plurality of segmented characters mainly based on an artificial neural network, and trains a neural network distributor using a plurality of obtained features, so as to obtain a result by matching; and the image recognition unit recognizes the emergency lane boundary using a pixel-level feature by extracting a road edge and a characteristic curve.

3. The supervision and penalty system for expressway emergency lane occupancy according to claim 1, wherein the mobile terminal is a smartphone or tablet computer running an operating system selected form the group consisting of Android, iOS, windows phone, Symbian, BlackBerry OS, and any other operating system.

4. A supervision and penalty method for expressway emergency lane occupancy, using a supervision and penalty system for expressway emergency lane occupancy, wherein, the supervision and penalty system comprises a mobile terminal and a central computer, wherein the mobile terminal further comprises a real-name authentication module, an image uploading module, and a positioning, storing and uploading module, wherein the real-name authentication module is used to receive personal identity information of a registered user; the image uploading module is used to receive a plurality of violation photos taken by the user and upload the plurality of violation photos to a background central computer; and the positioning, storing and uploading module is used to read current location information of the user when taking a photo, and automatically store and match the plurality of violation photos taken by the user;

the central computer further comprises an image identification unit, an image processing unit, an image recognition unit, a violation determining unit, an information matching unit, and a data storage unit wherein the image identification unit is used to parse coded information of a plurality of images and determine whether each of the plurality of images is an original image without a later-stage editing; the image processing unit is used to pre-process a plurality of captured images, so as to improve the image quality, eliminate noises, and improve the image definition; the image recognition unit recognizes and records a license plate number of a violation vehicle through a license plate positioning module, a license plate character segmentation module, and a license plate character recognition module; the violation determining unit further comprises a lane boundary determining module and a vehicle state determining module; wherein the lane boundary determining module determines whether a vehicle is on an emergency lane according to an emergency lane boundary recognized by the image recognition unit the vehicle state determining module automatically compares two or more processed photos to determine whether the vehicle is traveling, pulling over or stopping on the emergency lane; the vehicle state determining module automatically selects a feature point of each of the plurality of images and compares a relative position between the feature points to determine a state of the vehicle, and if the vehicle is in a stopping state, the vehicle state determining module continues to automatically search for a red feature point in the each of the plurality of images, and determines whether a double flashing light of the vehicle is turned on to indicate an emergency breakdown situation, and if it is impossible to make a determination, the vehicle state determining module records a serial number of the each of the plurality of images and feeds back the same to a manual processing side;

the information matching unit is used to access a provincial registered vehicle owner information database, and upon obtaining the license plate number of the violation vehicle search for corresponding owner information according to the license plate number;

the data storage unit is used to maximize a data extraction convenience and storage security in a mixture of an online storage and a nearline storage;

the mobile terminal stores and sends, through an image transmission by a reporter and a positioning of the reporter, information of a vehicle traveling on and occupying the emergency lane; the central computer receives the plurality of images and location information from the mobile terminal through a network transmission under a network data transmission encryption protocol, examines, through a computer built-in examining module, whether the plurality of images are properly captured, checks a road section where a violation behavior occurs, and determines whether the violation behavior is an emergency lane violation behavior, recognizes and records the license plate, accesses owner information for a fine and point deduction notification, and rewards the reporter;

the method comprising the following steps:

Step 1: when a first vehicle is traveling on or occupying an emergency lane and a second vehicle passing by notices a violation behavior, turning on the mobile terminal wherein the mobile terminal is allowed to read the user location, photographing a driving state of the first vehicle, and obtaining a plurality of photos capable of clearly showing the license plate number and the emergency lane line, wherein at least two photos are taken; after taking the plurality of photos, selecting a plurality of images from the plurality of photos and uploading the plurality of images, and determining whether to add a text description according to the situation;

Step 2: after obtaining the plurality of violation images and the location information, preliminarily distinguishing, by the central computer, an image source through the image identification unit to determine whether the plurality of violation images are taken in a normal condition, and if yes, performing Step 3; otherwise, sending a warning to the reporter, providing feedback to the mobile terminal through an information feedback mechanism, and imposing a penalty;

Step 3: performing, by the central computer, a compression, an enhancement and restoration, and a segmentation and description processing on a plurality of uploaded violation images through the image processing unit, so as to eliminate noises, improve the image definition, and enable the captured image to be more easily recognized and distinguished;

Step 4: performing, by the central computer, an accurate recognition on the license plate in the plurality of images by applying the license plate positioning module, the license plate character segmentation module, and the license plate character recognition module in the image recognition unit, and recognizing the emergency lane boundary using the pixel-level feature by extracting the road edge and the characteristic curve;

Step 5: performing, by the central computer, a violation determination on a reported vehicle through the violation determining unit, and if it is determined that the reported vehicle occupies the emergency lane in a non-emergency situation, performing Step 6; otherwise, explaining the situation to the reporter, and sending feedback to a client end through the information feedback mechanism;

Step 6: invoking, by the central computer, a database in the system through the information matching unit to automatically search for registered owner information corresponding to the license plate of the violation vehicle, sending a violation-handling decision, and specifying a time limit within which the owner should deal with the violation at a specific public security department; meanwhile, checking, by the central computer, reporter information and rewarding the reporter after determining that the report is effective; and Step 7: storing, in the data storage unit for a future reference, the reporter information and corresponding reported violation place information, license plate information of the violation vehicle, and owner information of the violation vehicle as an entire information block.

5. A supervision and penalty method for expressway emergency lane occupancy, comprising the following steps:

Step 1: when a first vehicle is traveling on or occupying an emergency lane and a second vehicle passing by notices a violation behavior, turning on a mobile terminal wherein the mobile terminal is allowed to read a user location, photographing a driving state of the first vehicle, and obtaining a plurality of photos capable of clearly showing a license plate number and an emergency lane line, wherein at least two photos are taken; after taking the plurality of photos, selecting a plurality of images from the plurality of photoes and uploading the plurality of images, and determining whether to add a text description according to the situation;

Step 2: after obtaining the plurality of violation images and location information, preliminarily distinguishing, by a central computer, an image source through an image identification unit to determine whether the plurality of images are taken in a normal condition, and if yes, performing Step 3; otherwise, sending a warning to a reporter, providing feedback to the mobile terminal through an information feedback mechanism, and imposing a penalty;

Step 3: performing, by the central computer, a compression, an enhancement and restoration, a segmentation and description processing on a plurality of uploaded violation images through an image processing unit, so as to eliminate noises, improve the image definition, and enable the plurality of captured images to be more easily recognized and distinguished;

Step 4: performing, by the central computer, an accurate recognition on a license plate in the plurality of images by applying a license plate positioning module, a license plate character segmentation module, and a license plate character recognition module in an image recognition unit, and recognizing an emergency lane boundary using a pixel-level feature by extracting a road edge and a characteristic curve;

Step 5: performing, by the central computer, a violation determination on a reported vehicle through a violation determining unit, and if it is determined that the reported vehicle occupies the emergency lane in a non-emergency situation, performing Step 6; otherwise, explaining the situation to the reporter, and sending feedback to a client end through the information feedback mechanism;

Step 6: invoking, by the central computer, a database in the system through an information matching unit to automatically search for registered owner information corresponding to the license plate of a violation vehicle, sending a violation-handling decision, and specifying a time limit within which the owner should deal with the violation at a specific public security department; meanwhile, checking, by the central computer, reporter information and rewarding the reporter after determining that the report is effective; and Step 7: storing, in a data storage unit for a future reference, each of the reporter information and corresponding reported violation place information, license plate information of the violation vehicle, and owner information of the violation vehicle as an entire information block.

6. The supervision and penalty method for expressway emergency lane occupancy, using a supervision and penalty system for expressway emergency lane occupancy according to claim 4, wherein in the image recognition unit, the license plate positioning module is used to perform an image feature search to find a plurality of areas conforming to a plurality of license plate features as a plurality of candidate areas, analyze the plurality of candidate areas to select a most matching area as an area to be recognized, and separate the area to be recognized from the image; the license plate character segmentation module is used to segment a selected license plate area into a plurality of individual characters to be recognized respectively, wherein a vertical projection method is adopted for a character segmentation; the license plate character recognition module performs a feature extraction on a plurality of segmented characters mainly based on an artificial neural network, and trains a neural network distributor using a plurality of obtained features, so as to obtain a result by matching; and the image recognition unit recognizes the emergency lane boundary using a pixel-level feature by extracting a road edge and a characteristic curve.

7. The supervision and penalty method for expressway emergency lane occupancy, using a supervision and penalty system for expressway emergency lane occupancy according to claim 4, wherein the mobile terminal is a smartphone or tablet computer running an operating system selected form the group consisting of Android, iOS, windows phone, Symbian, BlackBerry OS, and any other operating system.

\* \* \* \* \*